United States Patent
Song et al.

(10) Patent No.: US 10,181,334 B1
(45) Date of Patent: Jan. 15, 2019

(54) SPIN-ORBIT TORQUE BASED MAGNETIC RECORDING

(71) Applicant: Western Digital Technologies, Inc., San Jose, CA (US)

(72) Inventors: Suping Song, Fremont, CA (US); Zhanjie Li, Pleasanton, CA (US); Michael Kuok San Ho, Redwood City, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/631,868

(22) Filed: Jun. 23, 2017

(51) Int. Cl.
G11B 5/127 (2006.01)
G11B 5/31 (2006.01)

(52) U.S. Cl.
CPC ............ G11B 5/1278 (2013.01); G11B 5/314 (2013.01); G11B 5/3133 (2013.01)

(58) Field of Classification Search
None
See application file for complete search history.

(56) References Cited

U.S. PATENT DOCUMENTS

| | | |
|---|---|---|
| 8,238,059 B1 | 8/2012 | Tang et al. |
| 8,295,006 B2 | 10/2012 | Sugano et al. |
| 8,611,046 B2 | 12/2013 | Wu et al. |
| 9,196,271 B1 | 11/2015 | Shirotori et al. |
| 9,230,571 B1 | 1/2016 | Chen et al. |
| 9,299,367 B1 * | 3/2016 | Tang ...................... G11B 5/127 |
| 9,305,583 B1 | 4/2016 | Zhang et al. |
| 9,311,934 B1 | 4/2016 | Shiimoto et al. |
| 9,355,654 B1 | 5/2016 | Mallary |
| 9,361,912 B1 | 6/2016 | Liu et al. |

(Continued)

FOREIGN PATENT DOCUMENTS

JP    2010062531 A  *  3/2010

OTHER PUBLICATIONS

Song, et al.; Micromagnetic Analysis of Adjacent Track Erasure of Wrapped-Around Shielded PMR Writers; IEEE Transactions on Magnetics; vol. 45, No. 10; dated Nov. 10, 2009; 10 total pages.

(Continued)

*Primary Examiner* — William J Klimowicz
(74) *Attorney, Agent, or Firm* — Patterson & Sheridan, LLP; Steven Versteeg

(57) ABSTRACT

The present disclosure generally relates to data storage devices, and more specifically, to a magnetic media drive employing a magnetic recording head. The head includes a main pole, a spin Hall structure surrounding at least a portion of the main pole at a location that is recessed from a media facing surface (MFS), and a spin-torque structure surrounding at least a portion of the main pole at the MFS. Spin-orbit torque (SOT) is generated from the spin Hall structure. The spin-torque structure magnetization switching (or precession) is induced by the SOT. The SOT based head with the spin-torque structure increases both track density (tracks per inch) and linear density (bit per inch). The areal density capability (ADC), which is the product of tracks per inch and bit per inch, can be further improved by removing the side shield and the leading shield, when the spin-torque structure is utilized in the SOT based head.

30 Claims, 7 Drawing Sheets

(56) References Cited

U.S. PATENT DOCUMENTS

| | | |
|---|---|---|
| 9,466,319 B1 | 10/2016 | Tang et al. |
| 9,697,855 B1* | 7/2017 | Liu .................. G11B 5/6082 |
| 9,947,347 B1* | 4/2018 | Van Der Heijden .. G11B 5/372 |
| 2008/0232001 A1 | 9/2008 | Bonhote et al. |
| 2008/0278861 A1 | 11/2008 | Jiang et al. |
| 2009/0052095 A1* | 2/2009 | Yamada ................ G11B 5/02 |
| | | 360/324 |
| 2015/0287426 A1 | 10/2015 | Mihajlovic et al. |
| 2017/0076741 A1* | 3/2017 | Tang .................... G11B 5/112 |

OTHER PUBLICATIONS

Mihajlovic, et al.; Spin Orbit Torque Switching of CoFeB Magnetic Free Layers With Pt and Ta Heavy Metals for SOT MRAM development; IEEE Magnetics; TMRC 2016; Aug. 17-19, 2016; pp. 53 and 54.

* cited by examiner

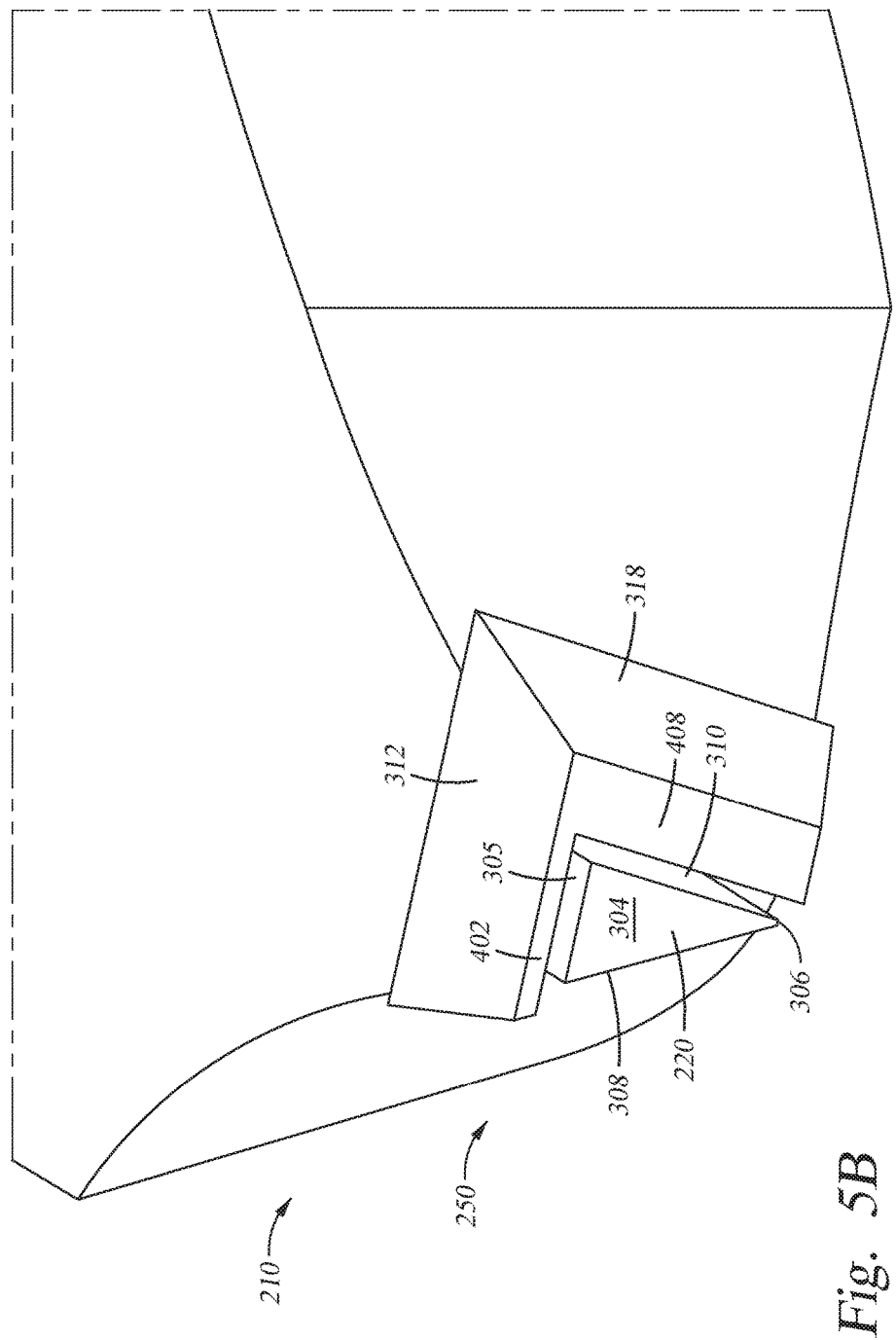

SPIN-ORBIT TORQUE BASED MAGNETIC RECORDING

BACKGROUND

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). For example, microwave assisted magnetic recording (MAMR) utilizes spin-transfer torque (STT), which is generated from a pseudo spin-valve structure. During operation, electrical current flows from the main pole to the trailing shield hot seed layer, and the spin-torque layer (STL) magnetization switching (or precession) is induced by the STT.

The pseudo spin-valve structure is difficult to make, and high switching current and voltage ($V_{jump}$) are utilized during its operation, leading to a lower level of energy efficiency. Furthermore, conventional magnetic recording devices include side shields that improve the track density, but additional steps are needed to form the side shields. In addition, side shields can erase the data from near track.

Therefore, there is a need in the art for an improved data storage device.

SUMMARY OF THE DISCLOSURE

The present disclosure generally relates to data storage devices, and more specifically, to a magnetic media drive employing a magnetic recording head. The head includes a main pole, a spin Hall structure surrounding at least a portion of the main pole at a location that is recessed from a media facing surface (MFS), and a spin-torque structure surrounding at least a portion of the main pole at the MFS. Spin-orbit torque (SOT) is generated from the spin Hall structure. The spin-torque structure magnetization switching (or precession) is induced by the SOT. The SOT based head with the spin-torque structure increases both track density (tracks per inch) and linear density (bit per inch). The areal density capability (ADC), which is the product of tracks per inch and bit per inch, can be further improved by removing the side shield and the leading shield when the spin-torque structure is utilized in the SOT based head.

In one embodiment, a magnetic recording head includes a main pole, a spin Hall structure surrounding at least a portion of the main pole, wherein the spin Hall structure is recessed from a media facing surface, and a spin-torque structure coupled to the spin Hall structure, wherein the spin-torque structure surrounds at least a portion of the main pole at the media facing surface.

In another embodiment, a magnetic recording head includes a trailing shield hot seed layer, a main pole, wherein the main pole includes a surface at a media facing surface and a plurality of surfaces adjacent the surface, a spin Hall structure recessed from the media facing surface, wherein the spin Hall structure surrounds at least two surfaces of the plurality of surfaces of the main pole, and a spin-torque structure coupled to the spin Hall structure, wherein the spin-torque structure surrounds at least two surfaces of the plurality of surfaces of the main pole at the media facing surface.

In another embodiment, a data storage device includes a magnetic read head, and a magnetic write head. The magnetic write head includes a trailing shield hot seed layer, a main pole, and a spin-torque structure, wherein the magnetic write head does not include a side shield. The spin-torque structure comprises a first portion disposed between the main pole and the trailing shield hot seed layer.

In another embodiment, a magnetic recording head includes a main pole, means for generating spin-orbit torque, and means for magnetization switching that is induced by the spin-orbit torque.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5B is a perspective view of the portion of the write head of FIG. 2 according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a main pole, a spin Hall structure surrounding at least a portion of the main pole at a location that is recessed from a MFS, and a spin-torque structure surrounding at least a portion of the main pole at the MFS. Spin-orbit torque (SOT) is generated from the spin Hall structure. The spin-torque structure magnetization switching (or precession) is induced by the SOT. The SOT based head with the spin-torque structure increases both track density (tracks per inch) and linear density (bit per inch). The areal density capability (ADC), which is the product of tracks per inch and bit per inch, can be further improved by removing the side shield and the leading shield when the spin-torque structure is utilized in the SOT based head.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
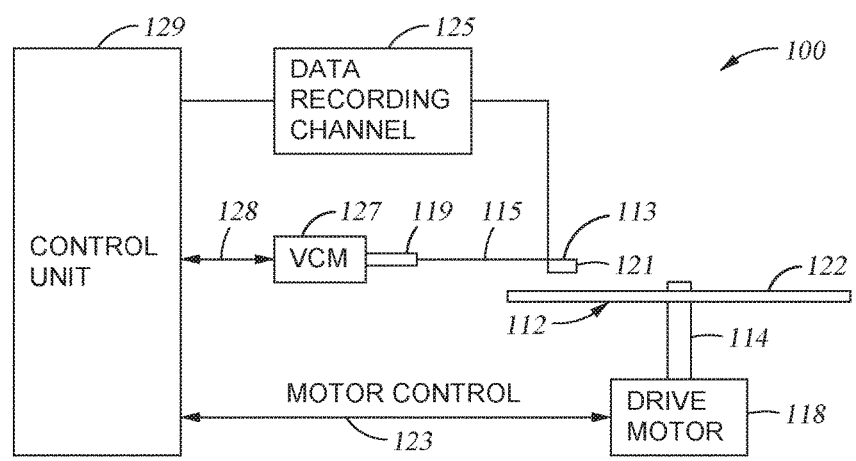
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a spin Hall structure for generating SOT. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
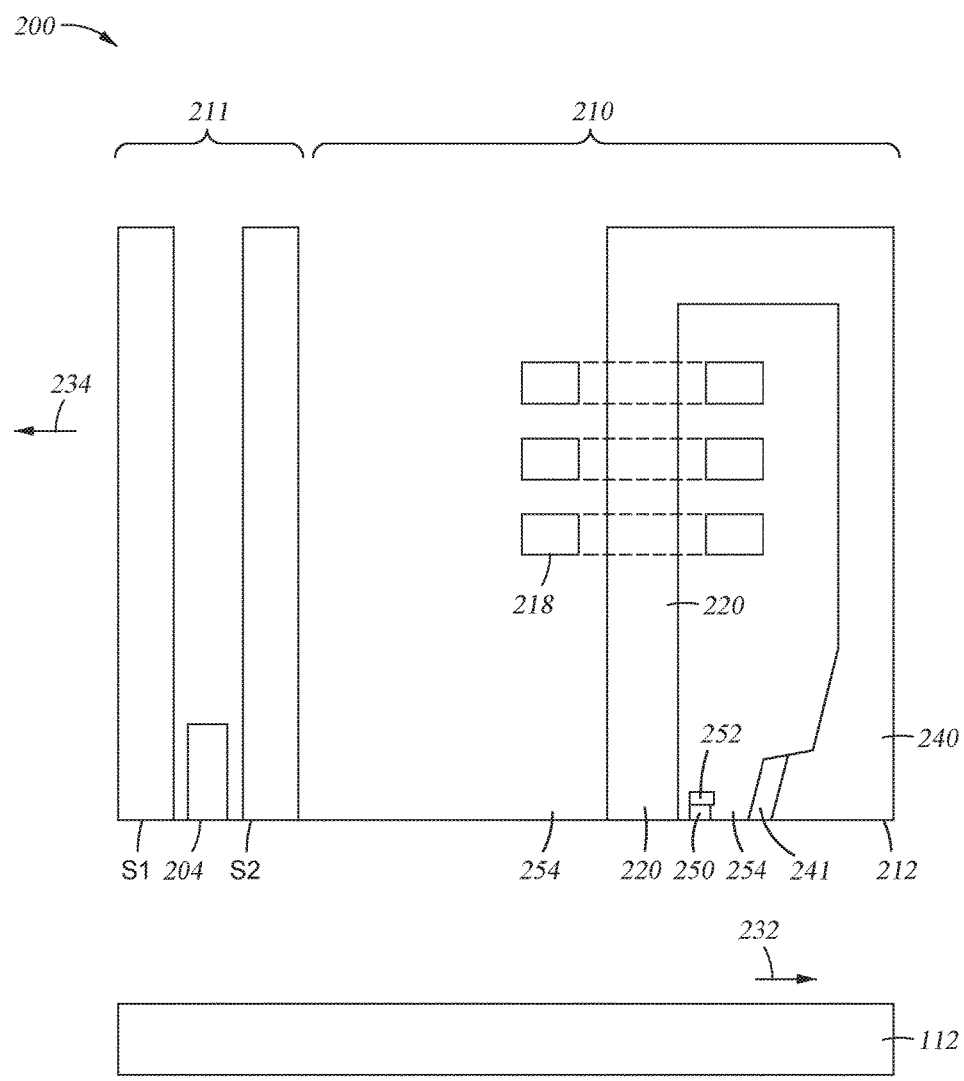
FIG. 2 is a fragmented, cross sectional side view of a read/write head facing a magnetic disk according to one embodiment.

FIG. 2 is a fragmented, cross sectional side view of a read/write head 200 facing the magnetic disk 112 according to one embodiment. The read/write head 200 may correspond to the magnetic head assembly 121 described in FIG. 1. The read/write head 200 includes a MFS 212, such as an air bearing surface (ABS), facing the disk 112, a magnetic write head 210, and a magnetic read head 211. As shown in FIG. 2, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a trailing shield 240, a spin-torque structure 250, a spin Hall structure 252, and a coil 218 that excites the main pole 220. The main pole 220 may include a tapered portion (not shown) extending from a location recessed from the MFS 212 to the MFS. The coil 218 may have a "pancake" structure which winds around a back-contact between the main pole 220 and the trailing shield 240, instead of a "helical" structure shown in FIG. 2. The spin-torque structure 250 surrounds at least a portion of the main pole 220 at the MFS 212, and the spin Hall structure 252 surrounds at least a portion of the main pole 220 at a location recessed from the MFS 212. A trailing shield hot seed layer 241 may be coupled to the trailing shield 240, and the trailing shield hot seed layer 241 may face the spin-torque structure 250 and the spin Hall structure 252. The space between the spin-torque structure 250 (including the spin Hall structure 252) and the main pole 220 is filled with the dielectric material 254, such as alumina. The dielectric material 254 is also disposed between the spin-torque structure 250 (including the spin Hall structure 252) and the trailing shield hot seed layer 241, and between the MR shield S2 and the main pole 220. The main pole 220 may be a magnetic material such as a FeCo alloy. The trailing shield 240 may be a magnetic material, such as NiFe alloy. The trailing shield hot seed layer 241 may include a high moment sputter material, such as CoFeN or FeXN, where X includes at least one of Rh, Al, Ta, Zr, and Ti.

The spin-torque structure 250 may be a magnetic material, such as a soft magnetic material, for example CoFe alloy, NiFe alloy, CoFeB alloy or half-metals. The spin Hall structure 252 may be a heavy metal, such as beta phase tantalum (β-Ta), beta phase tungsten (β-W), platinum (Pt), hafnium (Hf), a heavy metal alloy of tungsten with hafnium, iridium, or bismuth doped copper, a topological insulator such as a (Bi,Sb)Te, or antiferromagnetic materials such as MnIr, XMn (X=Fe, Pd, Ir, and Pt) and Cu—Au—I type antiferromagnets. In some embodiments, the spin Hall structure 252 may be coupled to the spin-torque structure 250 (i.e., the spin Hall structure 252 may be in direct contact with the spin-torque structure 250). In some embodiments, one or more intervening layers may be disposed between the spin Hall structure 252 and the spin-torque structure 250. During operation, an electrical current flows through the spin Hall structure 252, which has strong spin-orbit coupling, and the spin Hall structure 252 generates SOT. The SOT generated by the spin Hall structure 252 induces magnetization switching (or precession) of the spin-torque structure 250.

Conventional magnetic recording head includes a leading shield and one or more side shields, which are both made of a magnetic material. The leading shield is disposed between the main pole 220 and the MR shield S2, and the side shields sandwich the main pole in the cross-track direction, indicated by Z-axis. The presence of the leading shield and the side shield can lead to increased track density, but additional process steps are needed to form the leading shield and the side shields. Because the spin-torque structure 250 increases both track density and linear density, ADC can be improved without the leading shield and the side shield when the spin-torque structure is utilized in the SOT based head. The process of forming the SOT based head is simplified without the leading shield and the side shield. As shown in FIG. 1, there is no leading shield, or a magnetic material, disposed between the main pole 220 and the magnetic read head 211. Thus, the main pole 220 faces the magnetic read head 211. The definition of the term "face" is extended to include a dielectric material located between a first element that is facing a second element and the second element. There is no magnetic material located in between the first element that is facing the second element and the second element. For example, the main pole 220 faces the MR shield S2 of the magnetic read head 211 means that a dielectric material, not a magnetic material, is located between the main pole 220 and the MR shield S2 of the magnetic read head 211. Furthermore, there is no side shield, or a magnetic material, disposed adjacent the main pole 220 along the cross-track direction. For example, there is no side shield, or a magnetic material, sandwiching the main pole 220 along the cross-track direction.

Figure 3A:
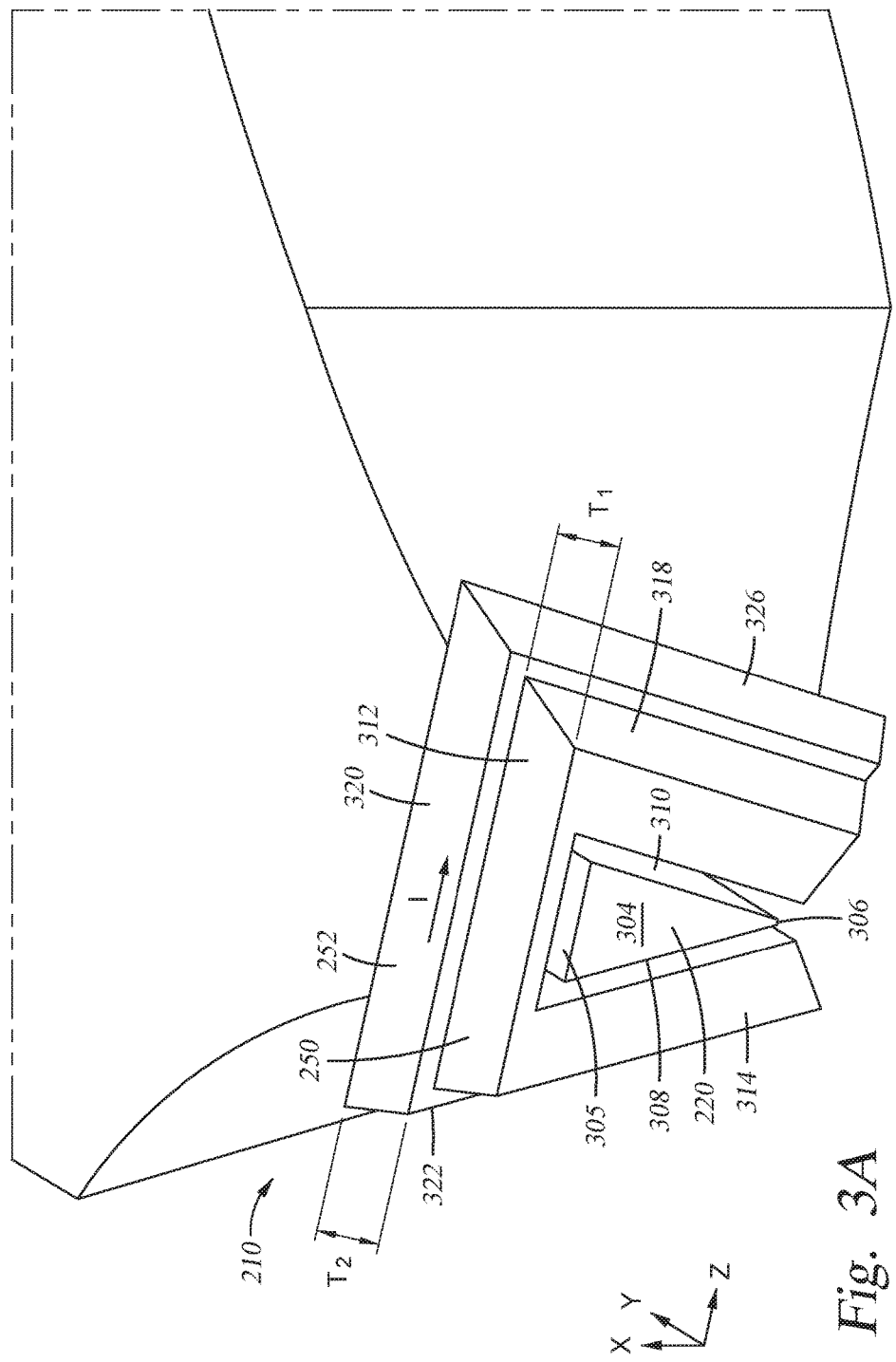
FIG. 3A is a perspective view of a portion of a write head of FIG. 2 according to one embodiment.

FIG. 3A is a perspective view of a portion of the write head 210 of FIG. 2 according to one embodiment. The dielectric material 254 is omitted for clarity. As shown in FIG. 3A, the main pole 220 includes a first surface 304 at the MFS 212, a second surface 305 adjacent the first surface 304, a third surface 306 opposite the second surface 305, a fourth surface 308 connecting the third surface 306 and the second surface 305, and a fifth surface 310 opposite the fourth surface 308. The plurality of surfaces 305, 306, 308, 310 are disposed adjacent the first surface 304. At least a portion of the main pole 220 at the MFS 212 is surrounded by the spin-torque structure 250. The spin-torque structure 250 is disposed at the MFS 212. The spin-torque structure 250 surrounds the second, fourth, and fifth surfaces 305, 308, 310 of the main pole 220. The spin-torque structure 250 is coupled to the spin Hall structure 252 disposed at a location that is recessed from the MFS 212. The spin Hall structure 252 surrounds at least a portion of the main pole 220 at locations recessed from the MFS 212. The spin Hall structure 252 surrounds the second, fourth, and fifth surfaces 305, 308, 310. The spin-torque structure 250 has a thickness $T_1$ along the Y-axis. In one embodiment, the thickness $T_1$ ranges from about 1.5 nm to about 15 nm. The spin Hall structure 252 also has a thickness $T_2$ along the Y-axis. In one embodiment, the thickness $T_2$ ranges from about 2.5 nm to about 100 nm. The spin Hall structure 252 is recessed from the MFS by a distance that equals the thickness $T_1$ of the spin-torque structure 250. During operation, AC electrical current (I) flows from the preamp (not shown) to the spin Hall structure 252, and the electrical current (I) may flow through the spin Hall structure 252, as shown in FIG. 3A. The spin Hall structure 252 generates SOT, which induces magnetization switching (or precession) of the spin-torque structure 250.

The spin-torque structure 250 includes a first portion 312, a second portion 314 connected to the first portion 312, and a third portion 318 opposite the second portion 314. The first portion 312 faces the trailing shield hot seed layer 241 (as shown in FIG. 2). The first portion 312 is substantially parallel to the second surface 305 of the main pole 220. The second portion 314 is substantially parallel to the fourth surface 308 of the main pole 220. The third portion 318 is substantially parallel to the fifth surface 310 of the main pole 220. In some embodiments, the spin-torque structure 250 surrounds the second surface 305, the fourth surface 308, and the fifth surface 310, while the third surface 306 of the main pole 220 may not face a portion of the spin-torque structure 250, as shown in FIG. 3A. A dielectric material, such as the dielectric material 254 shown in FIG. 2, is disposed between each portion 312, 314, 318 of the spin-torque structure 250 and a corresponding surface of the surfaces 305, 308, 310 of the main pole 220. In some embodiments, only a dielectric material, such as the dielectric material 254 (as shown in FIG. 2) is disposed between the third surface 306 of the main pole 220 and the MR shield S2 of the magnetic read head 211.

The spin Hall structure 252 includes a first portion 320, a second portion 322 connected to the first portion 320, and a third portion 326 opposite the second portion 322. The first portion 320 of the spin Hall structure 252 is coupled to the first portion 312 of the spin-torque structure 250, the second portion 322 of the spin Hall structure 252 is coupled to the second portion 314 of the spin-torque structure 250, and the third portion 326 of the spin Hall structure 252 is coupled to the third portion 318 of the spin-torque structure 250. The first portion 320 of the spin Hall structure 252 may be substantially parallel to the first portion 312 of the spin-torque structure 250, the second portion 322 of the spin Hall structure 252 may be substantially parallel to the second portion 314 of the spin-torque structure 250, and the third portion 326 of the spin Hall structure 252 may be substantially parallel to the third portion 318 of the spin-torque structure 250. In some embodiments, the spin Hall structure 252 surrounds the second surface 305, the fourth surface 308, and the fifth surface 310, while the third surface 306 of the main pole 220 may not face a portion of the spin Hall structure 252, as shown in FIG. 3A. A dielectric material, such as the dielectric material 254 shown in FIG. 2, is disposed between each portion 320, 322, 326 of the spin Hall structure 252 and a corresponding surface of the surfaces 305, 308, 310 of the main pole 220.

The first portion 312 of the spin-torque structure 250 has a width along the X-axis and a length along the Z-axis. The second portion 314 and the third portion 318 of the spin-torque structure 250 each have a width along the Z-axis and a length along the X-axis. The first portion 320 of the spin Hall structure 252 has a width along the X-axis and a length along the Z-axis. The second portion 322 and the third portion 326 of the spin Hall structure 252 each have a width along the Z-axis and a length along the X-axis. The widths and lengths of portions 320, 322, 326 of the spin Hall structure 252 may be greater than corresponding widths and lengths of portions 312, 314, 318 of the spin-torque structure 250.

Figure 3B:
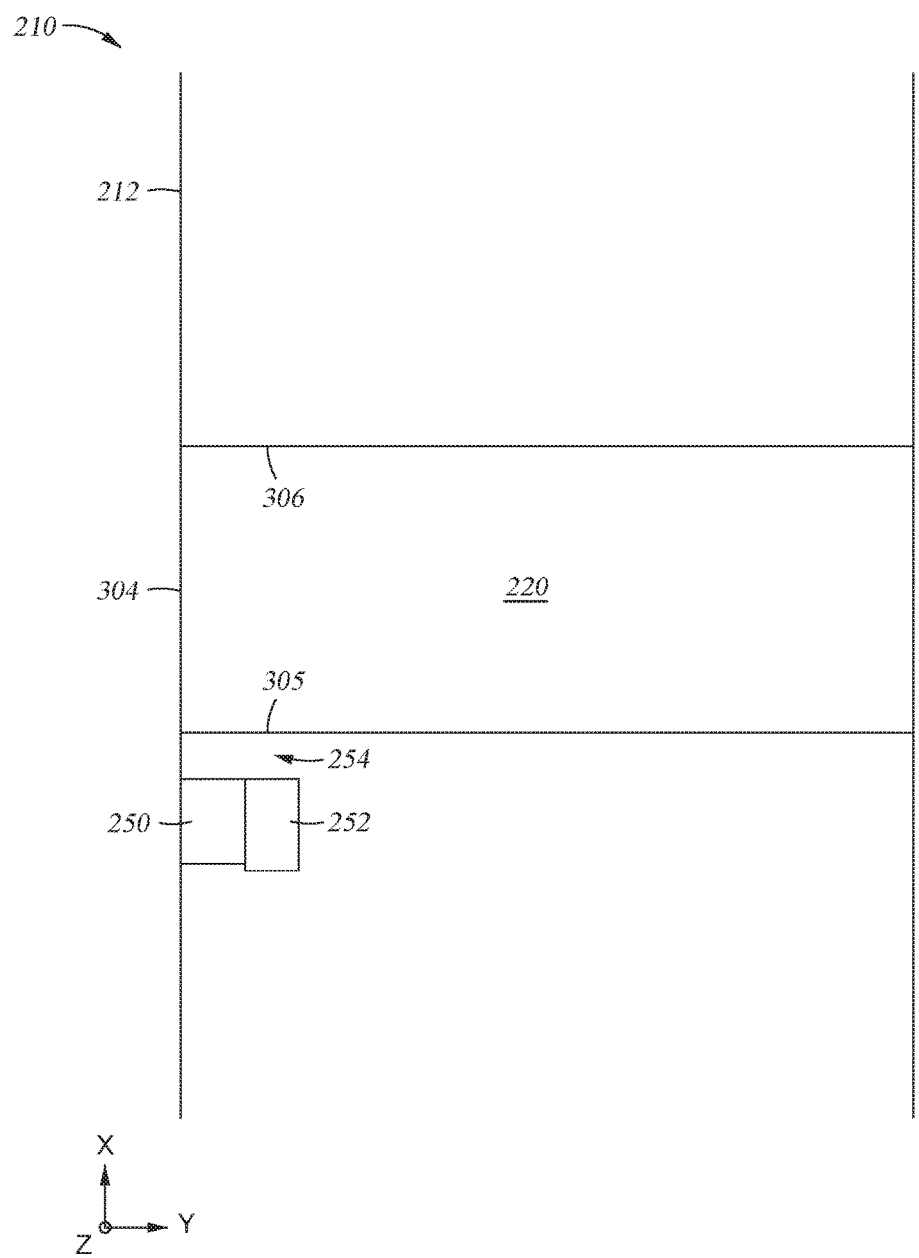
FIG. 3B is a cross sectional side view of the portion of the write head of FIG. 2 according to one embodiment.

FIG. 3B is a cross sectional side view of the portion of the write head 210 of FIG. 2 according to one embodiment. As shown in FIG. 3B, the main pole 220 has the first surface 304 at the MFS 212, the second surface 305 adjacent the first surface 304, and the third surface 306 opposite the second surface 305. The spin-torque structure 250 is disposed at the MFS 212 and surrounds at least a portion of the main pole 220 at the MFS 212. The spin Hall structure 252 is coupled to the spin-torque structure 250 and is recessed from the MFS 212. The spin Hall structure 252 surrounds at least a portion of the main pole 220 at a location that is recessed from the MFS 212. The dielectric material 254 is disposed between the spin-torque structure 250 and the main pole 220 and between the spin Hall structure 252 and the main pole 220.

Figure 4:
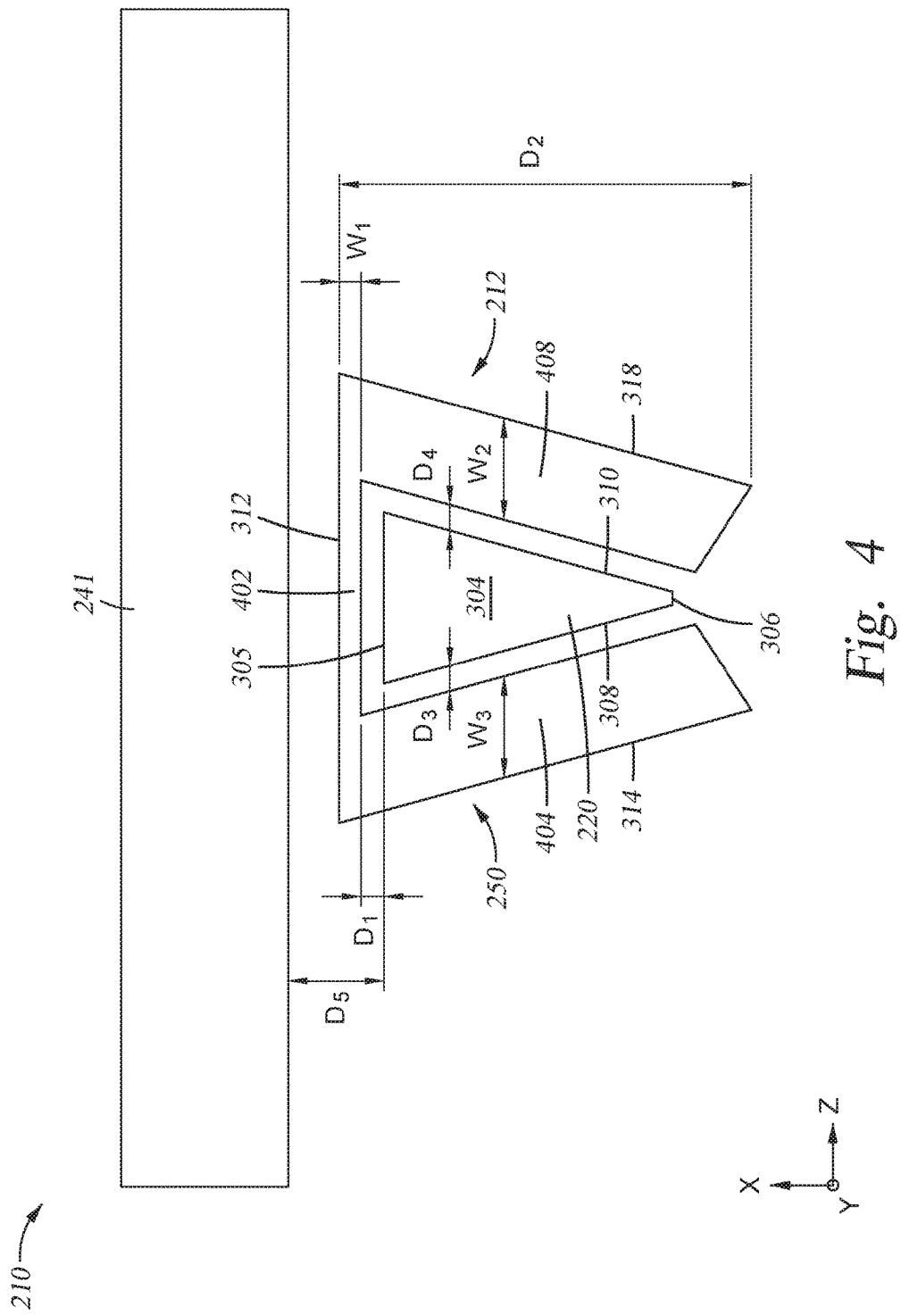
FIG. 4 is a media facing surface (MFS) view of a portion of the write head of FIG. 2 according to one embodiment.

FIG. 4 is a MFS view of a portion of the write head 210 of FIG. 2 according to one embodiment. As shown in FIG. 4, the write head 210 includes the trailing shield hot seed layer 241, the main pole 220, and the spin-torque structure 250 surrounding at least a portion of the main pole 220 at the MFS 212. The dielectric material 254 and the spin Hall structure 252 are omitted for clarity. The main pole 220 includes the first surface 304 at the MFS 212, the second surface 305 adjacent the first surface 304, the third surface 306 opposite the second surface 305, the fourth surface 308 connecting the third surface 306 and the second surface 305, and the fifth surface 310 opposite the fourth surface 308. The spin-torque structure 250 includes the first portion 312 having a surface 402 at the MFS 212, the second portion 314 having a surface 404 at the MFS 212, and the third portion 318 having a surface 408 at the MFS 212. The surface 402 of the first portion 312 of the spin-torque structure 250 may be substantially parallel to the second surface 305 of the main pole 220, and a distance $D_1$ may be between the surface 402 and the second surface 305. The surface 404 of the second portion 314 of the spin-torque structure 250 may be substantially parallel to the fourth surface 308 of the main pole 220, and a distance $D_3$ may be between the surface 404 and the fourth surface 308. The surface 408 of the third portion 318 of the spin-torque structure 250 may be substantially parallel to the fifth surface 310 of the main pole 220, and a distance $D_4$ may be between the surface 408 and the fifth surface 310. The distances $D_1$, $D_3$ and $D_4$ may be substantially the same. In some embodiments, the distances $D_3$ and $D_4$ are substantially the same, while the distance $D_1$ is less than or greater than the distance $D_3$ or $D_4$. In some embodiments, the distances $D_3$ and $D_4$ are substantially the same, while the distance $D_1$ is substantially different than the distance $D_3$ or $D_4$. In some embodiments, the distances $D_3$ and $D_4$ are substantially different. The distance $D_1$ ranges from about 1 nm to about 15 nm. The distance $D_3$ ranges from about 1 nm to about 20 nm. The distance $D_4$ ranges from about 1 nm to about 20 nm. The spin-torque structure 250 includes a dimension $D_2$ in the down-track direction, as indicated by the X-axis. The dimension $D_2$ is equal to or greater than the distance $D_1$ plus the dimension of the surface 304 in the down-track direction.

The surface 402 of the first portion 312 has a width $W_1$ along the X-axis, the surface 404 of the third portion 314 has a width $W_3$ along the Z-axis, and the surface 408 of the third portion 318 has a width $W_2$ along the Z-axis. The X-axis indicates the down-track direction, and the Z-axis indicates the cross-track direction. The width $W_3$ may be substantially equal to or greater than the width $W_1$. The width $W_2$ may be substantially equal to or greater than the width $W_1$. The width $W_3$ may be substantially the same as the width $W_2$ or substantially different from the width $W_2$. The width $W_1$ may be any width within the write gap, defined by the distance $D_5$ between the trailing shield hot seed layer 241 and the second surface 305 of the main pole 220. In one embodiment, the distance $D_5$ is about 20 nm. The width $W_1$ may range from about 5 nm to about 12 nm, such as about 8 nm. The width $W_3$ is substantially greater than the width $W_1$. Because a side shield is not present, the width $W_3$ is not physically limited, unlike the width $W_1$, which is physically limited by the write gap. Thus, the width $W_3$ ranges from about 5 nm to about 50 nm, such as from about 30 nm to about 40 nm, for example 38 nm. In some embodiments, the ratio of the width $W_3$ to the width $W_1$ may range from about 1 to 10, such as from about 3 to 7, for example 5. In some embodiments, the width $W_2$ may be substantially the same as the width $W_3$.

In some embodiments, such as in a magnetic head utilizing shingled magnetic recording (SMR), the width $W_2$ may be substantially different than the width $W_3$. In some embodiments, only the second surface 305 and one of the fourth surface 308 and the fifth surface 310 face a portion of the spin Hall structure 252 and a portion of the spin-torque structure 250, as shown in FIGS. 5A and 5B.

Figure 5A:
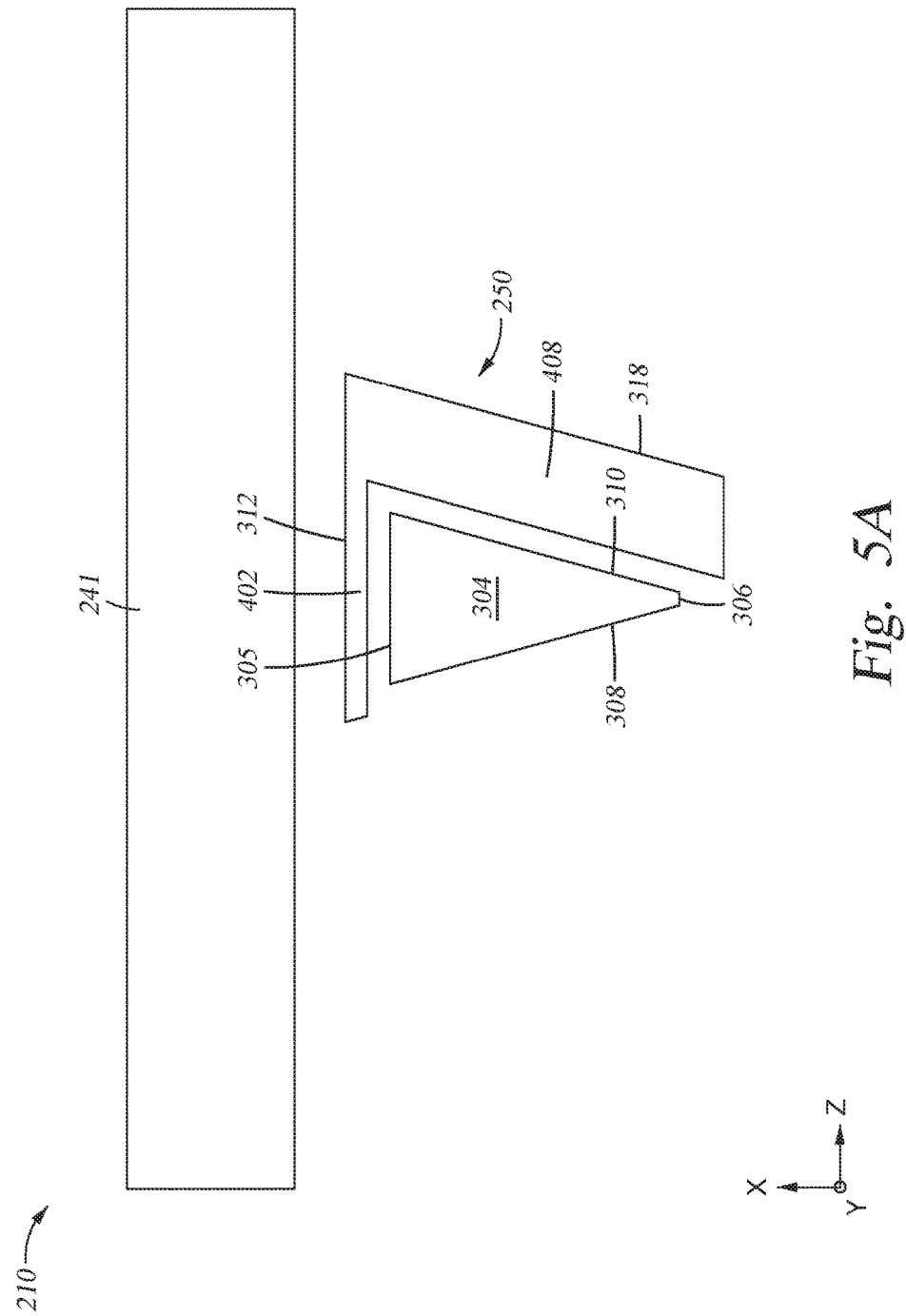
FIG. 5A is a MFS view of the portion of the write head of FIG. 2 according to another embodiment.

FIG. 5A is a MFS view of the portion of the write head 210 of FIG. 2, and FIG. 5B is a perspective view of the portion of the write head 210 of FIG. 2 according to another embodiment. As shown in FIGS. 5A and 5B, the write head 210 includes the trailing shield hot seed layer 241, the main pole 220, and the spin-torque structure 250 surrounding two surfaces of the main pole 220 at the MFS 212. The dielectric material 254 and the spin Hall structure 252 are omitted for clarity. The main pole 220 includes the first surface 304 at the MFS 212, the second surface 305 adjacent the first surface 304, the third surface 306 opposite the second surface 305, the fourth surface 308 connecting the third surface 306 and the second surface 305, and the fifth surface 310 opposite the fourth surface 308. The spin-torque structure 250 includes the first portion 312 having the surface 402 at the MFS 212, and the third portion 318 having the surface 408 at the MFS 212. Two surfaces 305, 310 of the main pole 220 are surrounded by the first portion 312 and the third portion 318 of the spin-torque structure 250, while surfaces 306, 308 of the main pole 220 are not surrounded by a portion of the spin-torque structure 250. Similarly, surfaces 305, 310 of the main pole 220 are surrounded by the first portion 320 and the third portion 326 of the spin Hall structure 252 (as shown in FIG. 3), while surfaces 306, 308 of the main pole 220 are not surrounded by a portion of the spin Hall structure 252. The second portion 314 of the spin-torque structure 250, along with the second portion 322 of the spin Hall structure 252, may be removed in a magnetic head utilizing SMR. In some embodiments, the spin-torque structure 250 includes the first portion 312 having the surface 402 at the MFS 212, and the second portion 314 having the surface 404 at the MFS 212. Two surfaces 305, 308 of the main pole 220 are surrounded by the first portion 312 and the second portion 314 of the spin-torque structure 250, while surfaces 306, 310 of the main pole 220 are not surrounded by a portion of the spin-torque structure 250. Similarly, surfaces 305, 308 of the main pole 220 are surrounded by the first portion 320 and the second portion 322 of the spin Hall structure 252 (as shown in FIG. 3), while surfaces 306, 310 of the main pole 220 are not surrounded by a portion of the spin Hall structure 252. The third portion 318 of the spin-torque structure 250, along with the third portion 326, may be removed in a magnetic head utilizing SMR. Therefore, in a magnetic head utilizing SMR, there is no side shield sandwiching the main pole 220 along the cross-track direction, as indicated by Z-axis, and the surface 306 of the main pole 220 is separated from the magnetic read head 211 (as shown in FIG. 2) by a dielectric material, such as the dielectric material 254 (as shown in FIG. 2). No magnetic material is disposed between the surface 306 of the main pole 220 and the magnetic read head 211. The write head 210 as shown in FIGS. 5A and 5B is a SMR head.

The benefits of having a SOT based head is that the spin-torque structure and the spin Hall structure can replace the side shield and the leading shield, leading to improved ADC. The process of forming a SOT based head without the side shield and the leading shield is simplified.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
a main pole;
a spin Hall structure surrounding at least a portion of the main pole, wherein the spin Hall structure is recessed from a media facing surface; and
a spin-torque structure coupled to the spin Hall structure, wherein the spin-torque structure surrounds at least a portion of the main pole at the media facing surface.

2. The magnetic recording head of claim 1, wherein the spin Hall structure comprises a material selected from the group consisting of beta phase tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), and antiferromagnets.

3. The magnetic recording head of claim 1, wherein the spin-torque structure comprises a magnetic material.

4. The magnetic recording head of claim 1, wherein the spin-torque structure comprises a first portion having a first surface at the media facing surface, a second portion having a second surface at the media facing surface, and a third portion having a third surface at the media facing surface.

5. The magnetic recording head of claim 4, further comprising a trailing shield hot seed layer, wherein the first portion of the spin-torque structure is disposed between the main pole and the trailing shield hot seed layer, the second portion of the spin-torque structure is connected to the first portion, and the third portion of the spin-torque structure is disposed opposite the second portion.

6. The magnetic recording head of claim 5, wherein the second surface has a width substantially greater than a width of the first surface.

7. The magnetic recording head of claim 6, wherein the third surface has a width substantially greater than the width of the first surface.

8. The magnetic recording head of claim 7, wherein the width of the second surface is substantially the same as the width of the third surface.

9. A magnetic recording head, comprising:
a trailing shield hot seed layer;
a main pole, wherein the main pole includes a surface at a media facing surface and a plurality of surfaces adjacent the surface;
a spin Hall structure recessed from the media facing surface, wherein the spin Hall structure surrounds at least two surfaces of the plurality of surfaces of the main pole; and
a spin-torque structure coupled to the spin Hall structure, wherein the spin-torque structure surrounds at least two surfaces of the plurality of surfaces of the main pole at the media facing surface.

10. The magnetic recording head of claim 9, wherein the spin Hall structure comprises a material selected from the group consisting of beta phase tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), and antiferromagnets.

11. The magnetic recording head of claim 9, wherein the spin-torque structure comprises a first portion and a second portion connected to the first portion, wherein the first portion is disposed between the trailing shield hot seed layer and the main pole.

12. The magnetic recording head of claim 11, wherein the magnetic recording head is a shingled magnetic recording head.

13. The magnetic recording head of claim 11, wherein the spin Hall structure comprises a first portion and a second portion, wherein the first portion of the spin Hall structure is coupled to the first portion of the spin-torque structure, and the second portion of the spin Hall structure is coupled to the second portion of the spin-torque structure.

14. The magnetic recording head of claim 11, wherein the first portion of the spin-torque structure has a first surface at the media facing surface and the second portion of the spin-torque structure has a second surface at the media facing surface.

15. The magnetic recording head of claim 14, wherein the second surface has a width substantially greater than a width of the first surface.

16. The magnetic recording head of claim 14, wherein the spin-torque structure further comprises a third portion opposite the second portion, wherein the third portion has a third surface at the media facing surface, and the third surface has a width substantially greater than the width of the first surface.

17. The magnetic recording head of claim 16, wherein the width of the third surface is substantially the same as a width of the second surface.

18. A data storage device, comprising:
a magnetic read head; and
a magnetic write head, comprising:
a trailing shield hot seed layer;
a main pole;
a spin Hall structure surrounding at least a portion of the main pole; and
a spin-torque structure, wherein the magnetic write head does not include a side shield, wherein the spin-torque structure comprises a first portion disposed between the main pole and the trailing shield hot seed layer.

19. The data storage device of claim 18, wherein the spin-torque structure surrounds at least a portion of the main pole at a media facing surface.

20. The data storage device of claim 18, wherein the spin-torque structure further comprises a second portion connected to the first portion, and a third portion opposite the second portion.

21. The data storage device of claim 20, wherein the first portion of the spin-torque structure has a first surface at a media facing surface, the second portion of the spin-torque structure has a second surface at the media facing surface, and the third portion of the spin-torque structure has a third surface at the media facing surface.

22. The data storage device of claim 21, wherein widths of the second surface and the third surface are greater than a width of the first surface.

23. A data storage device, comprising:
a magnetic read head; and
a magnetic write head, comprising:
a trailing shield hot seed layer;
a main pole; and
a spin-torque structure, wherein the magnetic write head does not include a side shield, wherein the spin-torque structure comprises a first portion disposed between the main pole and the trailing shield hot seed layer, wherein the spin-torque structure surrounds at least a portion of the main pole at a media facing surface, and wherein the magnetic write head further comprises a spin Hall structure recessed from the media facing surface, wherein the spin Hall structure is coupled to the spin-torque structure.

24. The data storage device of claim 23, wherein the spin Hall structure comprises a material selected from the group consisting of beta phase tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), and antiferromagnets.

25. A magnetic recording head, comprising:
a main pole;
means for generating spin-orbit torque; and
means for magnetization switching that is induced by the spin-orbit torque.

26. The magnetic recording head of claim 25, wherein the means for generating spin-orbit torque is recessed from a media facing surface.

27. The magnetic recording head of claim 25, wherein the means for magnetization switching is located at a media facing surface.

28. The magnetic recording head of claim 25, further comprising a trailing shield hot seed layer, wherein at least a portion of the means for magnetization switching is located between the trailing shield hot seed layer and the main pole.

29. The magnetic recording head of claim 28, wherein at least a portion of the means for generating spin-orbit torque is located between the trailing shield hot seed layer and the main pole.

30. The magnetic recording head of claim 25, wherein the means for generating spin-orbit torque is coupled to the means for magnetization switching.

* * * * *